WEIGHTED TIME ACCOUNTING IN TIME SHARED COMPUTER

Filed Feb. 7, 1968

INVENTOR
JOHN E. CROY
BY Carl V. Olson
ATTORNEY

United States Patent Office 3,518,633
Patented June 30, 1970

3,518,633
WEIGHTED TIME ACCOUNTING IN TIME SHARED COMPUTER

John E. Croy, Cherry Hill, N.J., assignor to RCA Corporation, a corporation of Delaware Filed Feb. 7, 1968, Ser. No. 703,670
Int. Cl. H04j 3/00
U.S. Cl. 340—172.5 1 Claim

ABSTRACT OF THE DISCLOSURE

A system for use with a time shared computer to keep account of the total rental value of the component parts of a computer facility employed by each one of many computer users. A register matrix is provided which includes a rental weight register and an elapsed time register for each user. The computer processor varies the contents of a rental weight register in accordance with the varying employment of the computer components by a respective user. The contents of each user's elapsed time register is periodically increased by the amount of the contents of the user's rental weight register.

Background of the invention

In a computer installation which is time shared by many users, it is desirable to distribute the cost of the computer facility by levying charges against each user. The amount of charge levied against each user should be equitably determined in accordance with the rental value of each component part of the computer system and the duration of its use.

When many users are sharing a typical multi-programming or time sharing computer facility, different component parts of the facility may be simultaneously employed by different users. For example, the processor and the printer may be employed by user A, the magnetic tape controller by user B, a tape station in the rewind mode by user C, and a data communications unit by several active users. The problem of accounting for each user's employment of the various component parts of the computer system is complicated by the fact that each user's employment of the components varies from moment-to-moment due to program interrupts, the initiation of new tasks, the termination of old tasks, and the performance of input/output operations. The existing elapsed time clocks associated with computers are inadequate for equitable allocating charges to many users. A possible solution is employment of a program-settable clock associated with each and every component part and device in the computer system. The clocks could be interrogated by the computer software at the beginning and termination of each activity to determine rental charges for each user. However, such an arrangement is prohibitively expensive in hardware costs, required main memory space, and computer house-keeping overhead.

Summary of the invention

In accordance with an example of the invention, there is provided a dynamically variable, weighted time clock for each user of the computer system. The variable time clocks are an adjunct to the computer system and include a register matrix with uniquely addressable storage locations for each computer user. Each storage location includes a rental weight register and an elapsed time register. The computer processor varies the contents of the rental weight register in accordance with the varying employment of the computer by a respective user. The contents of each user's elapsed time register is periodically increased by the amount of the contents of the user's rental weight register.

Description of the preferred embodiment

Figures 1, 2:
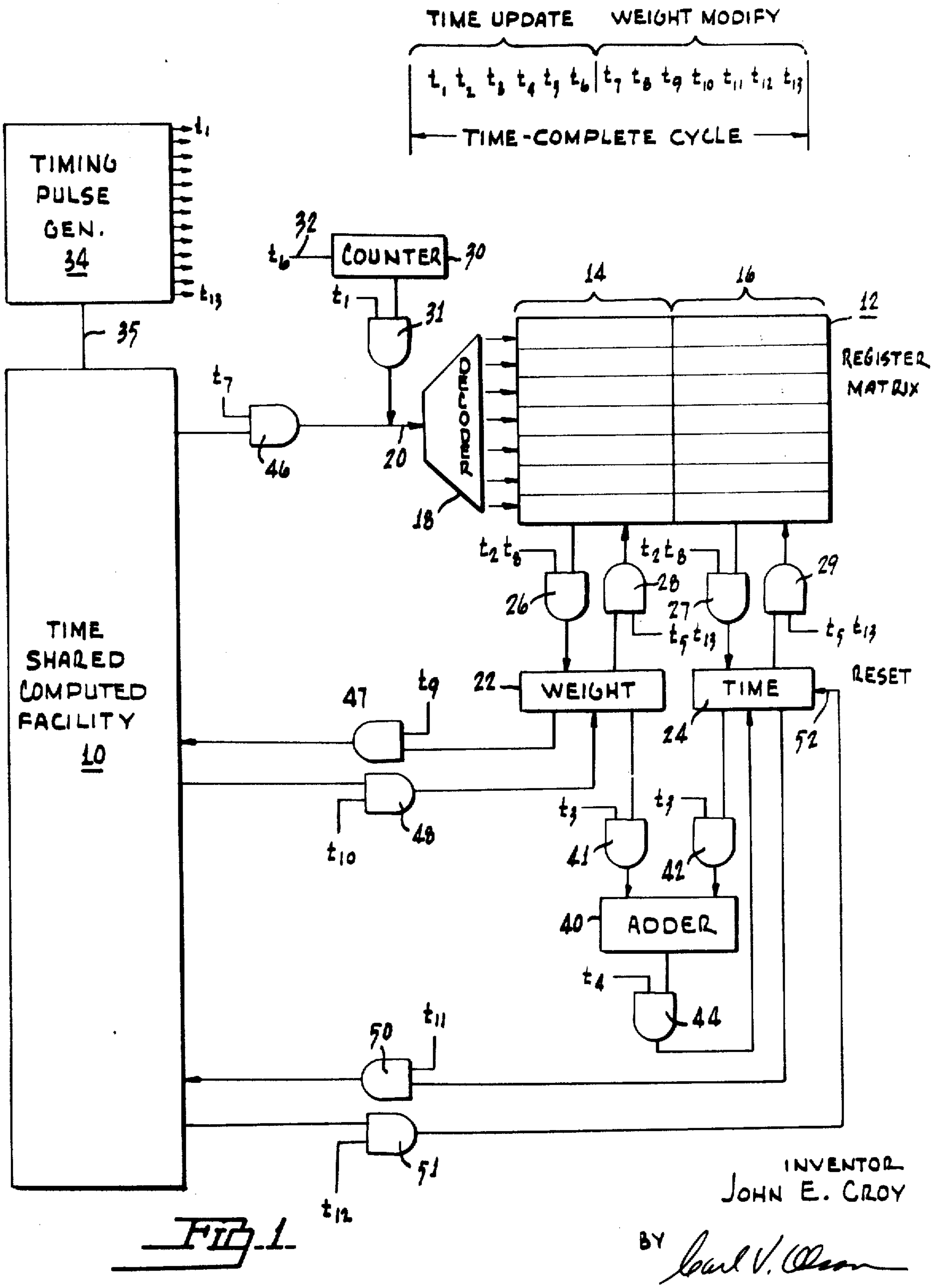
FIG. 1 is a block diagram of a weighted time accounting system for use in conjunction with a time shared computer.
FIG. 2 is a chart of timing pulses which will be referred to in describing the operation of the system of FIG. 1.

Referring now in greater detail to FIG. 1, there is shown a time shared computer facility 10 which is conventional in including at least one processing unit, at least one high speed memory, magnetic drum and/or magnetic tape storage units and various other input, output and communications units. The computer facility 10 is a multi-programmed or time sharing computer facility in which a number of different programs of an individual user or a number of programs of a plurality of users, are executed in a time interlaced and a time overlapping manner intended to most fully utilize the component parts of the system.

As a time accounting adjunct to the computer 10, there is provided a register matrix 12 containing as many discretely addressable storage locations as there are users of, or programs in, the computer facility 10. Each storage location in matrix 12 includes a rental weighting field 14 and elapsed time field 16. Each storage location is accessible by an address decoder 18 in response to a coder user or address symbol applied to the input 20 of the decoder 18. The register matrix 12 may be constructed in any suitable known manner such as an array of integrated circuit transistor flip-flops or as random access memory including magnetic cores or other magnetic storage elements.

A rental weight register 22 and an elapsed time register 24 are provided to receive the corresponding fields of an accessed storage location in register matrix 12, the transfer to the registers being effected through gates 26 and 27, respectively. Gates 28 and 29 are provided for transferring the contents of the registers back to the addressed storage location in matrix 12.

An address counter 30 is constructed to be capable of counting through all the numbers representing user address symbols in the register matrix 12. The output of counter 30 is applied through a gate 31 to the input 20 of address decoder 18. The contents of the address counter 30 is incremented by 1 whenever a timing pulse is applied to the incrementing input 32 of the counter 30.

A timing pulse generator 34 is constructed in a conventional manner to provide appropriately spaced timing pulses $t_1$ through $t_{13}$ in a sequential cyclically-repeating manner. The operation of the timing pulse generator 34 is suitably synchronized with the timing in the computer facility 10 by means of a synchronizing link 35.

A conventional 2-input added 40 is connected to receive one addend through a gate 41 from the rental weight register 22, and to receive another addend through the gate 42 from the elapsed time register 24. The sum produced by the adder 40 is held in an accumulator in the adder until read out through a gate 44 to the elapsed time register 24.

The user storage locations in register matrix 12 have been described as sequentially and cylically addressed by the address register counter 30. The user storage locations can also be individually and selectively accessed by the processers in computer 10 over a path including a gate 46. When a user storage location is accessed and read out to rental weight register 22 by the computer 10, the contents of register 22 is transferred to the computer processor over the path including gate 47. The computer may appropriately modify the received contents of the rental weight register and then return the modified weight value to the register over a path including gate 48. The elapsed time field of a storage location accessed by the computer is also made available to the computer over a path from the elapsed time register 24 through a gate 50 to the computer 10. The computer utilizes the contents of the elapsed time register 24 and resets the register 24 to 0 by a signal over a path including gate 51 to the reset input 52 of the register 24.

Operation

In the operation of the weighted time accounting system of FIG. 1, the timing pulse generator 34 operates continuously in generating timing pulses $t_1$ through $t_{13}$ as shown in FIG. 2. The timing pulses $t_1$ through $t_6$ are employed during a time-updating portion of each timing cycle, and the pulses $t_7$ through $t_{13}$ are employed during a weight-modifying portion of each timing cycle. The complete timing cycle shown in FIG. 2 is continuously repeated.

At time $t_1$ of the given complete cycle, the contents of the counter 30 is passed through gate 31 to the input 20 of address decoder 18 to access a corresponding one of the user storage locations. The information accessed is transferred at time $t_2$ through gates 26 and 27 to registers 22 and 24. At time $t_3$ the contents of the two registers are passed by gates 41 and 42 to the adder 40. The adder 40 contains a result or accumulator register. At time $t_4$ the sum from the result register in the adder 40 is passed through gate 44 and inserted into the elapsed time register 40. At time $t_5$, the contents of the registers 22 and 24 are returned to the address storage locations in the register matrix 12. Then at time $t_6$, the address register counter 30 is incremented by 1 by the application of a timing pulse to the incrementing input 32.

In the operation as thus far described, the contents of the elapsed time field 16 of one user's storage location has been increased by an amount having a weight or relative value determined by the contents of the users rental weight field 14. The contents of the user's rental weight field was previously determined in accordance with the number of computer components being utilized by that user, and the weights of the various computer components being utilized. When the complete timing cycle repeats and timing pulses $t_1$ through $t_6$ again occur, the procedure is repeated for the next following user. During succeeding complete cycles, the procedure is repeated for all the other users. Then, the counter 30 resets and counts again through all of the user's addresse symbols. In this way, the contents of each user's elapsed time field 16 is periodically updated by an amount representing the weight of the portions of the computer system employed by the user during the unit time duration since the last updating. The elapsed time field 16 always contains the sum of the use-weights during all previous unit time periods.

The weight-modifying portion of each complete timing cycle, including times $t_7$ through $t_{13}$, is reserved for use in changing the rental weights chargable against the users. Whenever the computer processor executes an instruction for a user which changes the complement of computer components employed by the user, the computer processor at time $t_7$ sends the user's address symbol through gate 46 to the address decoder 18 to access that user's storage location in matrix 12. The user's rental weight field accessed to the rental weight register 22 at $t_8$ is transferred through gate 47 at $t_9$ to the computer processor. The processor appropriately increases or decreases the value of the user's rental weight value, and returns it at time $t_{10}$ through gate 48 to the rental weight register 22. At time $t_{13}$ the register 22 contents is returned to field 14 in the register matrix 12. Thereafter, during the time-updating portion of the cycle in which the counter 30 accesses that user's storage location, the user's elapsed time field 16 is automatically incremented in accordance with the user's changed rental weight value.

The weight-modifying portion of each complete timing cycle is also available to the computer processor for the purpose of reading out a user's elapsed time field 16. The user's elapsed time is derived from the register 24 and applied through gate 50 at time $t_{11}$ to the computer. The computer utilizes the contents of the user's elapsed time field to compute the charges to be billed to the user. This operation may be performed periodically, such as on a daily, weekly or monthly basis. When the user's elapsed time field is thus employed, the computer resets the elapsed time register 24 to zero by applying a reset signal through gate 51 at $t_{12}$ to the reset input 52 of the register 24.

What is claimed is:

1. In a time shared computer system including component parts having differing rental values per unit of time, means for keeping account of the value of each user's employment of the component parts of the system, comprising:

a register matrix including a uniquely addressable storage location for each computer user, each storage location including a rental weight register and an elapsed time register, means operative during spaced time periods to cyclically and sequentially access said storage locations and add the contents of the rental weight register to the contents of the elapsed time register, means operative during intermediate time periods and responsive to a user address symbol from the computer to access the corresponding storage location for modification of the contents of the rental weight register in accordance with a change in the complement of component parts employed by a user, and means operative at accounting period intervals, such as monthly, and responsive to a user address symbol from the computer processor to access the corresponding storage location for utilization of the contents of the elapsed time register, and to then reset to zero the contents of the elapsed time register.

References Cited

UNITED STATES PATENTS

| | | | |
|---|---|---|---|
| 3,302,184 | 1/1967 | Lavenir | 340—172.5 |
| 3,427,594 | 2/1969 | Lavenir et al. | 340—172.5 |

RAULFE B. ZACHE, Primary Examiner